March 14, 1967 H. D. WILSON 3,309,232
ELECTRICAL STORAGE BATTERY
Filed July 8, 1964 2 Sheets-Sheet 1
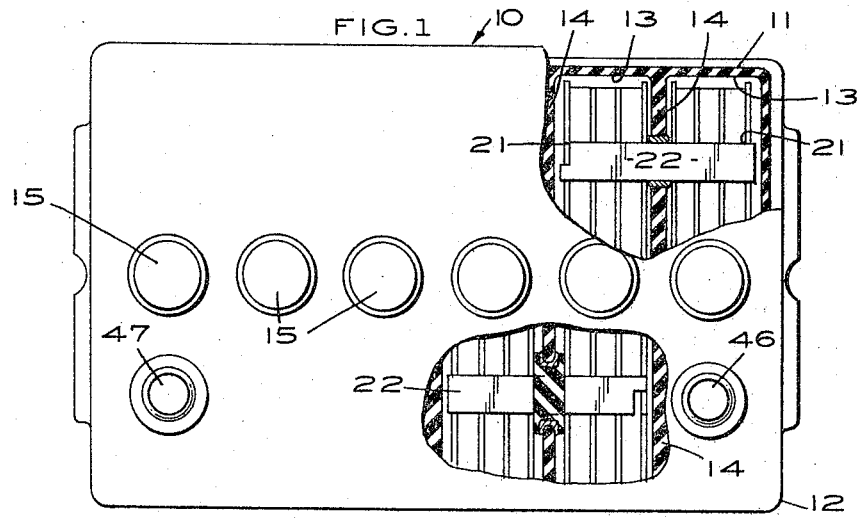
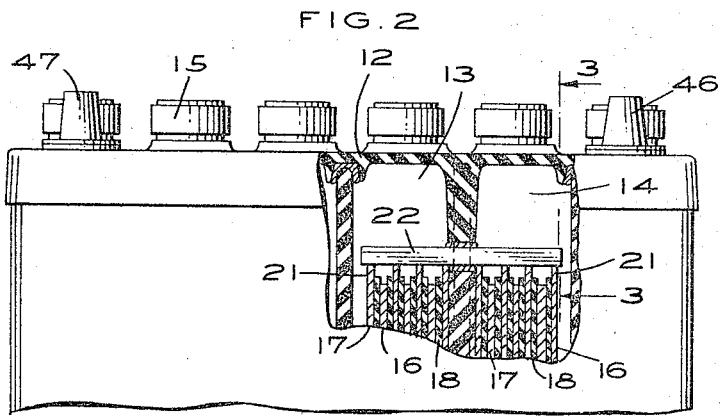
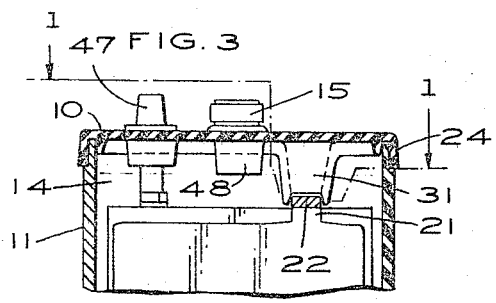
HARLAND D. WILSON
INVENTOR
BY J. R. Faulkner
K. L. Zerschling
ATTORNEYS

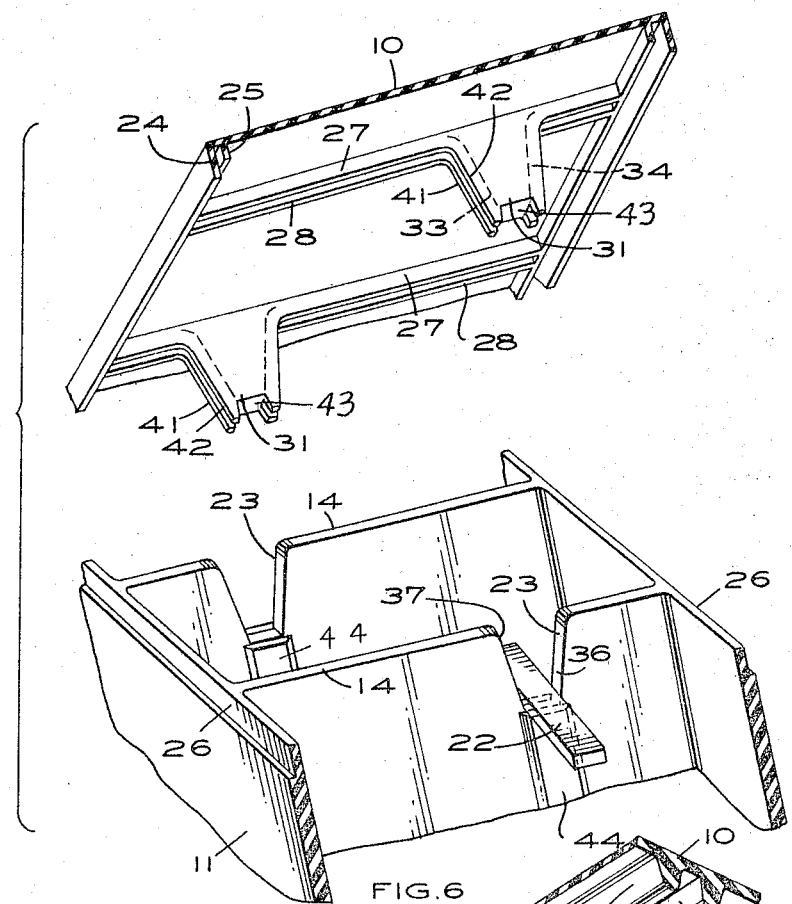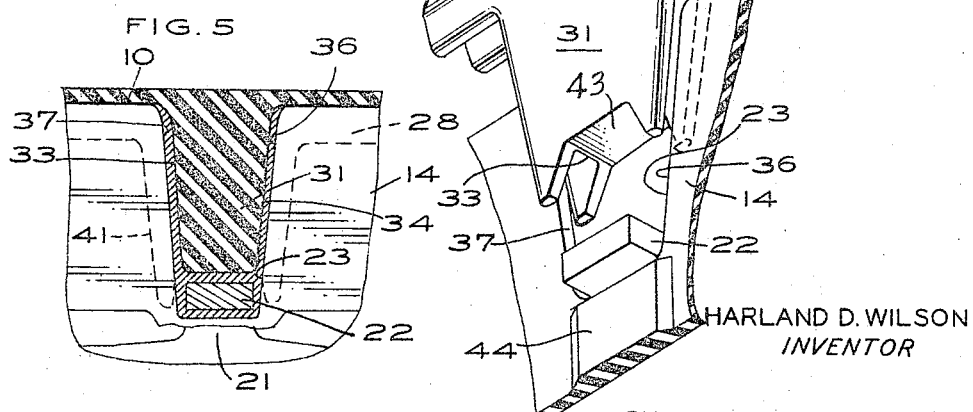

United States Patent Office 3,309,232
Patented Mar. 14, 1967

3,309,232
ELECTRICAL STORAGE BATTERY
Harland D. Wilson, Toledo, Ohio, assignor to Ford Motor Company, Dearborn, Mich., a corporation of Delaware
Filed July 8, 1964, Ser. No. 381,059
5 Claims. (Cl. 136—134)

This invention relates to an electrical storage battery and more particularly to an electrical storage battery having low resistance and low loss intercell connections.

In automotive applications, batteries are selected for their ability to crank an engine at low temperatures. This ability depends upon a number of factors including size and number of plates per cell, thickness and porosity of the separators used between the plates, specific gravity of the electrolyte, and length and cross section of the intercell connections joining the cells of the battery in series electrically.

In conventional battery construction, each cell is closed by a cover containing an opening. A vented battery cap closes this opening and it allows accumulated gases to escape and also serves as a means to permit water replenishment. Each cover is provided with two additional openings through which the cell terminals pass. These terminals are then attached to intercell connectors to provide a series connection of the cells so that the voltage of the individual cells is additive in the battery. This construction results in an objectionably long and high resistance intercell circuit in which a substantial loss of voltage occurs at high rates of battery discharge.

Attempts to reduce this voltage loss have been partially successful by passing the intercell connections beneath the cover surface. A single-piece cover has been used which provides gas vent openings from each cell, but only the battery's positive and negative terminals extend through the cover.

A variety of methods have been employed in passing the intercell connections from cell-to-cell beneath the one-piece covers. In each instance, the partitions between the cells have had to be pierced or notched to accommodate the intercell connection below the cover so that the cover could be sealed against intercell electrolyte leakage along the top edge of the partitions.

One of these methods includes the provision of a hole through each partition wall through which a connector is passed. A rubber bushing may be provided to effect a fluid tight fit with the hole. This construction has not been particularly successful because of the enlargement of the hole resulting from car vibration of the plate assemblies attached to each end of the connector.

Another method provides a notch in the top edge of each partition to which the intercell connection is made at a level even with or slightly below the top edge of the partitions. A double flanged one-piece multicell cover is used to effect an acid tight closure of all cells and prevent intercell electrolyte leakage. This method, while successful from the standpoint of acid tightness, requires that the intercell connections rise and pass over the partitions in such length as to be responsible for a substantial voltage loss when the battery is discharged at high rates.

The present invention provides a construction which successfully provides a fluid tight intercell connection of very low resistance. Consequently, when the battery is discharged at a high rate the resultant losses are minimal. In accordance with the invention, the partition wall is provided with a deep notch having a bottom wall that is located substantially at the same level as the tops of the battery plates in adjacent compartments. A straight conductive bar of electrical conductive material serves both as the plate straps that connect the battery plates in each compartment to one another and as an intercell connector that connects the battery plates in one compartment with the battery plates in the adjacent compartment. Sealing means are provided to seal this straight bar of electrically conductive material to the partition wall. It is located below the normal electrolyte level contained in each of the compartments or cells and, therefore, the sealing means prevents leakage of electrolyte between adjacent cells. It can be appreciated that this construction offers the ultimate in a low resistance, low loss intercell connection.

The sealing means for sealing the straight bar of conductive material to the partition wall includes a protrusion extending from the battery cover. This protrusion extends into the notch and preferably has extending spaced parallel flanges on the side walls thereof that extend over the side walls of the notch in the partition wall. Sealing compound of a suitable type is placed in the grooves formed by these flanges and around the straight bar of electrically conductive material to provide the fluid tight intercell connection between the battery plates in adjacent compartments that form the battery cells of the battery.

An object of the present invention is the provision of an electrical storage battery that exhibits a substantial voltage gain over known batteries under low temperature, high discharge conditions.

Another object of the present invention is the provision of an electrical storage battery that has intercell connectors of very low resistance.

A further object of the invention is the provision of an electrical storage battery that has low resistance, low loss intercell connections that provide effective seals between the electrolyte in adjacent compartments or cells of the battery.

Other objects and attendant advantages of the invention will be more readily apparent as the specification is considered in connection with the attached drawings in which:

FIGURE 1 is a top plan view of the battery with portions broken away to show the intercell connections between the cells or compartments of the battery;

FIGURE 2 is an elevational view of the battery shown in FIGURE 1 with a portion thereof shown in longitudinal section;

FIGURE 3 is a sectional view partially in elevation taken along the lines 3—3 of FIGURE 2;

FIGURE 4 is an exploded view of the battery casing, the battery cover and an intercell connection to show the interrelationship of these elements;

FIGURE 5 is an enlarged sectional view of the intercell connection of the battery, and FIGURE 6 is an enlarged exploded view showing the relationship of the intercell connector, the partition wall and the cover of the battery.

Referring now to the drawings in which like reference numerals designate like parts throughout the several views thereof, there is shown in FIGURE 1 an electrical storage battery 10 suitable for use in an automotive vehicle. The battery 10 includes a casing 11 constructed of a nonconductive material, preferably hard rubber, and a cover 12, also constructed of a nonconductive material such as hard rubber. The casing 11 is divided into a series of compartments or cells 13 by a number of integrally formed partition walls 14. In the standard automotive battery there are six of these compartments or cells 13. The battery cover 12 has a plurality of openings closed by battery caps 15 that both vent the cells and provide a means for replenishing the water in the cells.

As shown in FIGURE 2, each of the cells 13 has a plurality of battery plates including negative plates 16 separated from positive plates 17 by standard separators 18. In one of the compartments 13, the right-hand compartment shown in FIGURE 2, the negative plates or grids 16 have extending or raised lugs 21, while in the adjacent compartment the positive plates 17 have the raised lugs 21. The lugs 21 form the top of the plates 16 and 17. This is standard battery construction employed in any electrical storage battery used for automotive vehicle applications.

The positive plates 17 in the left-hand compartment, as shown in FIGURES 1 and 2, are connected together and the negative plates 16 of the right-hand compartment are connected together, and these two groups of cells are interconnected by a single straight bar of conductive material 22. The single straight bar of conductive material 22 thus serves as a combination plate strap and intercell connector. This straight bar of conductive material 22 is preferably of rectangular configuration in cross section, and has a flat bottom which is substantially the same width as the tops of the battery plate lugs 21. The lugs 21 are electrically connected to the straight bar of conductive material 22 by conventional techniques such as puddling or casting.

The partition wall of each of the compartments 13 is provided with a deep notch 23, preferably of trapezoidal form and having a flat bottom that is positioned at substantially the same level as (just slightly below) the tops of the lugs 21 of the battery plates 16 and 17. As shown more fully in FIGURES 3 and 4, the battery cover 12 has a pair of spaced flanges 24 and 25 positioned about the periphery thereof that cooperate with the stepped exterior side walls 26 of the battery casing 11 to provide a seal between the battery casing 11 and the cover 12 along the exterior walls of the battery casing.

The cover also has a plurality of sets of parallel flanges 27 and 28, as shown in FIGURES 4 and 6, and each set forms a groove for the reception of the end of the partition wall 14.

A protrusion 31 of complementary shape to the notch 23 in each partition wall 14 is formed in the cover 12 for each notch 23. This protrusion 31 projects downwardly from the top of the cover 12 and is tapered to form a wedge or trapezoid, complementary in shape to the trapezoidal flat bottomed notch 23. The side walls 33 and 34 of the protrusion 31, as shown in dotted lines, fit into the notch 23 closely adjacent the side walls 36 and 37 of this notch, but are spaced slightly therefrom to permit the reception of sealing compound. The side walls 33 and 34 of the protrusion 31 have spaced parallel extending flanges 41 and 42 that are extensions of the spaced parallel flanges 27 and 28. These extend over each side of the partition wall 14 when the protrusion 31 is properly positioned within the notch 23, as can readily be seen by reference to FIGURES 5 and 6.

As can best be seen by reference to FIGURES 4 and 6, the protrusion 31 has a flat bottom 43 that is substantially of the same dimension as the width of the straight bar of conductive material 22. The spaced parallel flanges 41 and 42 on the side walls 33 and 34 of the protrusion 31 extend downwardly beyond this bottom portion to provide more adequate sealing.

The partition walls 14 each have a portion of increased width to form a pilaster 44 below the notch 23. This provides a greater sealing surface below the straight bar of conductive material 22 that forms the intercell connector.

In assembling the battery 10, battery plates 16 and 17 and the separators 18 are first assembled into cells for reception into each of the compartments 13 of the battery 10. The combination plate strap and intercell connector formed of the straight bar of conductive material 22 is then electrically connected to the uppermost portion or lugs 21 of the positive terminals in one cell and the negative terminals in the adjacent cell by puddling or casting. This assembly may then be lowered into place in the battery with the intercell connector or straight bar of electrically conductive material 22 being lowered into the notch 23. Prior to this time, however, a layer of thixotropic epoxy base resin of buttery consistency is applied to the bottom of the notch 23 (at the top of the pilaster 44) in the partition wall 14. When the interconnected cells are lowered into their respective compartments 13, the intercell connector, straight bar electrically conductive material 22, seats and imbeds itself in this layer of resin.

The grooves formed by the flanges 24 and 25 around the perimeter of the battery cover 12 and the grooves formed by the spaced flanges 27 and 28, and by the spaced flanges 41 and 42 of the side walls 33 and 34 of protrusion 31, are filled with the same thixotropic epoxy base resin just prior to placing the cover on the casing 11. The wedge-like protrusion 31 mates with and partially fills the notches 23 above the intercell connectors 22. The epoxy resin in the grooves formed by the spaced flanges 41 and 42 seals the space between the wedge-like protrusion 31 and the notch 23 and completes the envelopment of the intercell connector formed by the straight bar of conductive material 22 as the wedge-like protrusion is forced into place in the notch 23. The thixotropic epoxy resin thus completely seals the intercell connector formed of the straight bar of conductive material 22 to the partition wall 14 and to the wedge-like protrusion 31 thereby providing a fluid tight intercell connection for the battery plates positioned in adjacent compartments 13 of the battery 10. Although a thixotropic epoxy base resin as full described in my copending application S.N. 378,107, filed June 26, 1964, is preferred, any other suitable sealing material, some of which are described in said copending application, may be employed.

It can be appreciated that the invention provides a battery intercell connection that has a very small electrical resistance and hence it provides a very low loss intercell connection when the battery is being discharged at high rates. A voltage gain of as much as one-half volt has been realized over conventional batteries when a 12 volt battery constructed in accordance with the invention has been discharged at a rate of 300 amperes at $-20°$ F. This is a very substantial gain in battery voltage for cold cranking conditions. To obtain the same voltage advantage in batteries of conventional construction would mean increasing the battery ampere hour capacity of these batteries by a very substantial amount, for example, from 15 to 20%.

It can be appreciated that a six cell battery, as shown on the drawings, is provided with five intercell connections as described, and that these intercell connections connect the various battery plates and cells in series electrically (see FIGURE 1). The battery is also provided with a negative battery terminal 46 and a positive battery terminal 47 that are connected respectively to the negative battery plates 16 in the cell immediately beneath the negative battery terminal 46 and to the positive battery plates 17 in the battery cell immediately beneath the positive terminal 47.

The intercell connection including the straight bar of electrical conducting material 22 is positioned below the normal level of the electrolyte positioned in each of the compartments or cells 13 as shown by the dotted lines in FIGURE 3 positioned at the bottom of sleeve 48 that receives battery cap 15.

The present invention thus provides an electrical storage battery in which the electrical resistance of the intercell connections has been reduced to a very minimum value thereby providing intercell connections that have very low electrical losses. This results in a substantial increase in the battery voltage available for cranking an internal combustion engine at very low temperatures.

It is to be understood that this invention is not to be limited to the exact construction shown and described but that various changes and modifications may be made without departing from the spirit and scope of the invention as defined in the appended claims.

I claim:
1. An electrical storage battery comprising, a casing, a partition wall dividing said casing into a first compartment and a second compartment, a plurality of battery plates positioned in said first compartment, a plurality of battery plates positioned in said second compartment, a deep notch having a flat bottom positioned in said partition wall, said flat bottom being positioned slightly below the tops of said battery plates positioned in said first compartment and said second compartment, a combination plate strap and intercell connector comprising a straight flat bottomed bar of conductive material positioned on the tops of the battery plates in said first and said second compartments and passing through said deep notch in said partition wall, said straight flat bottomed bar of conductive material being electrically connected to the tops of said battery plates in said first and said second compartments, said straight flat bottomed bar of electrically conductive material being positioned below the normal battery electrolyte level in said first and said second compartments, a cover for said casing, and a sealing means integral with said cover enveloping said straight flat bottomed bar of conductive material for forming a fluid tight intercell connection through said partition wall.

2. An electrical storage battery comprising, a casing, a partition wall dividing said casing into a first compartment and a second compartment, a plurality of battery plates positioned in said first compartment, a plurality of battery plates positioned in said second compartment, a deep notch having a flat bottom positioned in said partition wall, said flat bottom being positioned slightly below the tops of said battery plates positioned in said first compartment and said second compartment, a combination plate strap and intercell connector comprising a straight flat bottomed bar of conductive material positioned on the tops of the battery plates in said first and said second compartments and passing through said deep notch in said partition wall, said straight flat bottomed bar of conductive material being electrically connected to the tops of said battery plates in said first and said second compartments, said straight flat bottomed bar of electrically conductive material being positioned below the normal battery electrolyte level in said first and said second compartments, a cover for said casing, said cover including a protrusion extending into said notch, and sealing compound positioned around said straight flat bottomed bar of conductive material and sealing said straight flat bottomed bar of conductive material to said partition wall and said protrusion to provide a fluid tight intercell connection between said first compartment and said second compartment.

3. An electrical storage battery comprising, a casing, a partition wall dividing said casing into a first compartment and a second compartment, a group of battery plates of one polarity positioned in said first compartment and a group of battery plates of opposite polarity positioned in the other compartment, said partition wall having a trapezoidal notch positioned therein, the bottom of said notch being positioned at substantially the same level as the tops of said plurality of battery plates, a combination battery strap and intercell connection comprising a straight rectangular bar of conductive material connecting said plurality of battery plates of one polarity with each other, connecting said plurality of battery plates of the opposite polarity with each other and connecting said first group of said battery plates with said second group of battery plates, said straight rectangular bar of conductive material positioned near the bottom of said notch at a position below the normal battery electrolyte level in said first and said second compartments, a cover fitting over said casing and having a depending complementary trapezoidal wedge positioned in said trapezoidal notch closely adjacent said combination battery strap and intercell connector, and sealing means sealing said combination battery strap and intercell connector to said partition wall and to said wedge and sealing said wedge to said partition wall to form a fluid tight intercell connection through said partition wall.

4. An electrical storage battery comprising, a casing, a partition wall dividing said casing into a first and a second compartment, a plurality of battery plates positioned in said first compartment, a plurality of battery plates positioned in said second compartment, said partition wall having a notch with a flat bottom positioned therein, said flat bottom of said notch being on substantially the same level as the tops of said battery plates, a straight flat bottomed bar of conductive material electrically connected to the tops of said battery plates in said first compartment and said second compartment and passing through said notch closely adjacent the bottom of said notch at a position below the normal battery electrolyte level in said first and said second compartments, a unitary cover for said casing including means for sealing said partition wall to said cover, said means including a depending protrusion extending into said notch in said partition wall and terminating slightly above said flat bottomed bar of conductive material, said protrusion having a pair of spaced outer flanges on the side walls forming a pair of grooves for reception of the side walls of said notch, and sealing material positioned around said bar of conductive material, between said bar of conductive material and said partition wall, between said bar of conducting material and said depending protrusion, and between said partition wall and said protrusion to provide a fluid tight barrier between said compartments.

5. An electrical storage battery comprising, a casing, a partition wall dividing said casing into a first compartment and a second compartment, a plurality of battery plates positioned in said first and said second compartments, said partition wall having a notch positioned therein, the bottom of said notch being positioned substantially on the same level as the tops of said battery plates, a straight bar of conductive material lying on the tops of said battery plates and electrically connected thereto, said straight bar of conductive material passing through said notch at a position below the normal battery electrolyte level in said first and said second compartments and having just sufficient clearance with respect to the bottom of the notch to permit a thin layer of sealing compound to be positioned therebetween, a unitary cover for said casing, said unitary cover having a pair of spaced parallel flanges forming a groove for the reception of said partition wall, a depending protrusion extending into said notch to a position closely adjacent said straight bar of conductive material, said protrusion having a pair of side walls, a pair of spaced outer flanges on each of said side walls, said spaced outer flanges being continuations of said spaced parallel flanges forming said groove in said cover, said spaced outer flanges on each of said side walls forming grooves for the reception of the side walls of said notch, and sealing material positioned in said grooves and between the walls of said notch and said straight bar of conductive material and between said straight bar of conductive material and said protrusion to provide a fluid tight barrier between said compartments.

References Cited by the Examiner
UNITED STATES PATENTS
2,828,349  3/1958  Haunz _____ 136—134 XR
FOREIGN PATENTS
320,515  5/1957  Switzerland.

WINSTON A. DOUGLAS, *Primary Examiner.*
D. L. WALTON, *Assistant Examiner.*